Sept. 25, 1956 C. G. OLSON 2,763,956
SALMON EGG DISPENSER
Filed Feb. 11, 1955

INVENTOR
CARL G. OLSON
BY
McMorrow, Berman & Davidson
ATTORNEY

United States Patent Office 2,763,956
Patented Sept. 25, 1956

2,763,956
SALMON EGG DISPENSER

Carl G. Olson, Troy, Idaho

Application February 11, 1955, Serial No. 487,581

2 Claims. (Cl. 43—55)

This invention relates to fishermen's apparatus, and more particularly to an improved dispenser for salmon eggs and similar bait employed by fishermen.

A main object of the invention is to provide a novel and improved dispenser for salmon eggs, said dispenser being simple in construction, being easy to manipulate, and being arranged so that a salmon egg may be quickly and easily engaged on a fishing hook and may be thus easily extracted from the dispenser.

A further object of the invention is to provide an improved dispenser for salmon eggs and similar bait material, said dispenser being inexpensive to manufacture, being sturdy in construction, being compact in size, and being easy to fill.

Further objects and advantages of the invention will become apparent from the following description and claims, and from the accompanying drawings, wherein:

Figure 1:
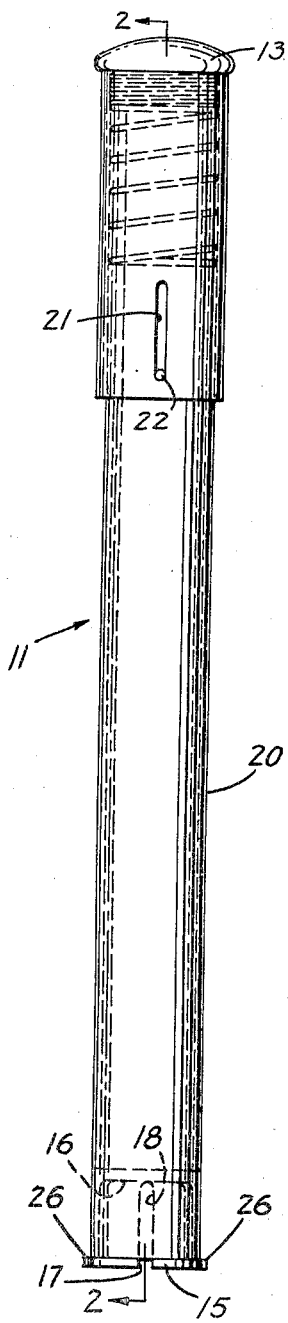
Figure 1 is a side elevational view of an improved dispenser for salmon eggs constructed in accordance with the present invention.

Referring to the drawings, the improved salmon eggs dispenser is designated generally at 11 and comprises a tubular container 12 having a removable top cover 13, said cover being provided with a skirt 14 having internal and external threads, the internal threads being threadedly engaged with cooperating threads provided on the top portion of the tubular container 12. The tubular container 12 is provided with a bottom end wall 15 and is formed with a large aperture 16 adjacent said bottom wall. The bottom wall 15 is further formed with a narrow diametrical slot 17, and the tubular container 12 is formed opposite the aperture 16 with a narrow vertical slot 18 of substantially similar height as the aperture 16, the vertical slot 18 merging with the diametrical slot 17 in the bottom wall 15.

Figure 2:
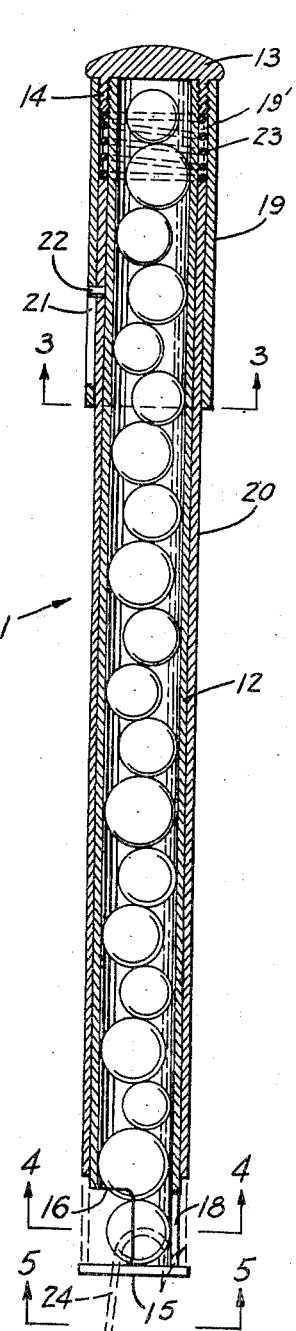
Figure 2 is a vertical cross sectional view taken on the line 2—2 of Figure 1 and showing the dispenser in open position.
Figure 3:
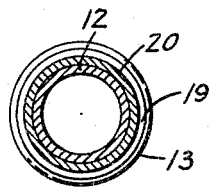
Figure 3 is an enlarged horizontal cross sectional view taken on the line 3—3 of Figure 2.
Figure 4:
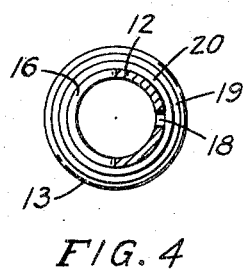
Figure 4 is an enlarged horizontal cross sectional view taken on the line 4—4 of Figure 2.
Figure 5:
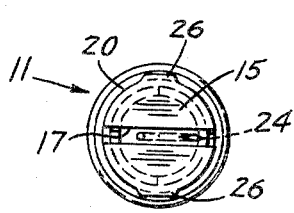
Figure 5 is an enlarged bottom view of the dispenser taken on the line 5—5 of Figure 2.

Designated at 19 is a sleeve member which is threadedly engaged with the external threads of the skirt member 14, as shown in Figure 2, whereby the sleeve member 19 is secured in coaxial relationship to the container 12 and is spaced therefrom to define an annular recess 19¹. Thus, the sleeve member 19 defines a depending skirt member which is secured to the removable top wall element 13 and which is coaxial with and is spaced outwardly from the tubular container 12.

Designated at 20 is an elongated sleeve member which is slidably mounted on the tubular container 12 and which has its top end portion slidably received in the annular recess 19¹ defined between the depending skirt member 19 and the tubular container 12, as is clearly shown in Figure 2. The depending member 19 is formed with a vertical slot 21, and a guide pin 22 is secured to the sleeve member 20, said guide pin being slidably received in the slot 21 to guide the sleeve member for longitudinal movement on the container 12. A coiled spring 23 surrounds the upper portion of the tubular container and is contained in the recess between the skirt element 19 and the container 12, said spring bearing between the bottom edge of skirt 14 and the top rim of the sleeve 20 to bias the sleeve 20 downwardly to the position thereof shown in Figure 1, wherein the lower end portion of the sleeve covers the aperture 16. As will be readily apparent, the aperture 16 may be uncovered, as when it is desired to remove a salmon egg from the device, by pushing the sleeve 20 upwardly with respect to the top end cap 13 of the dispenser, which may be readily accomplished by grasping the sleeve 20 and by exerting a downward force on the top wall 13 with the thumb of the same hand which is grasping the sleeve 20.

As shown in Figure 2, a fishing hook, shown in dotted view at 24, may be engaged through the diametrical slot 17 and may be engaged with the lowermost salmon egg in the container, the vertical slot 18 allowing the barb portion of the hook to be moved as far inwardly as is necessary to impale the bottom salmon egg, as illustrated in Figure 2. Thereafter, the egg and hook may be withdrawn from the dispenser, whereupon the force on the top cap element 13 is released, allowing the dispenser to close.

As shown, the bottom wall 15 is formed with the diametrically opposed outwardly projecting lugs 26, 26 which serve as stop means to limit downward movement of the sleeve member 20 and to retain said sleeve member 20 on the tubular container 12 when said sleeve member is in the position thereof shown in Figure 1, namely, covering the aperture 16.

While a specific embodiment of an improved dispenser for salmon eggs and similar bait material has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a tubular container for salmon eggs and similar bait material, said container having a top end wall and a bottom end wall, said container being formed with a dispensing aperture adjacent said bottom end wall, a depending skirt member secured to said top end wall, said skirt member being coaxial with and being spaced outwardly from the container to define an annular recess, a sleeve member surrounding said container and having an end portion slidably received in said annular recess, and spring means in said annular recess biasing said sleeve member to a position covering said aperture, said sleeve member being movable axially on said container to uncover said aperture to permit access to the salmon eggs or other bait material in the container, and said bottom end wall being formed with a relatively narrow slot communicating with said aperture for the reception of a fishing hook.

2. In combination, a tubular container for salmon eggs and similar bait material, said container having a top end wall and a bottom end wall, said container being formed with a dispensing aperture adjacent said bottom end wall, a depending skirt member secure to said top end wall, said skirt member being coaxial with and being spaced outwardly from the container to define an annular recess, a sleeve member surrounding said container and having an end portion slidably received in said annular recess, and spring means in said annular recess biasing said sleeve member to a position covering said aperture, said sleeve member being movable axially on said container to uncover said aperture to permit access to the salmon eggs or similar bait material in the container, said container being formed opposite said aperture with a relatively narrow vertical slot, and the bottom end wall being formed with a relatively narrow diametrical slot communicating with said aperture and being coplanar with and communicating with said vertical slot and being arranged to receive a fishing hook.

References Cited in the file of this patent

UNITED STATES PATENTS

| | | |
|---|---|---|
| 1,955,559 | Narrow | Apr. 17, 1934 |
| 2,518,590 | Andrist | Aug. 15, 1950 |

FOREIGN PATENTS

| | | |
|---|---|---|
| 100,533 | Sweden | Dec. 23, 1940 |
| 123,508 | Great Britain | Feb. 27, 1919 |